(12) United States Patent
Cypher

(10) Patent No.: US 7,606,994 B1
(45) Date of Patent: Oct. 20, 2009

(54) CACHE MEMORY SYSTEM INCLUDING A PARTIALLY HASHED INDEX

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 514 days.

(21) Appl. No.: 10/985,525

(22) Filed: Nov. 10, 2004

(51) Int. Cl.
*G06F 9/26* (2006.01)

(52) U.S. Cl. .................. 711/216; 711/118; 711/122; 711/127; 711/206; 711/217; 711/220

(58) Field of Classification Search .................. None
See application file for complete search history.

(56) References Cited

U.S. PATENT DOCUMENTS

| | | | | |
|---|---|---|---|---|
| 4,020,466 A | * | 4/1977 | Cordi et al. .................. | 707/201 |
| 5,509,135 A | * | 4/1996 | Steely, Jr. ................... | 711/147 |
| 5,581,725 A | * | 12/1996 | Nakayama .................. | 711/122 |
| 5,649,143 A | * | 7/1997 | Parady ....................... | 711/220 |
| 5,724,538 A | * | 3/1998 | Morris et al. ............... | 711/206 |
| 6,167,510 A | * | 12/2000 | Tran .......................... | 712/239 |
| 6,253,285 B1 | | 6/2001 | Razdan | |
| 6,282,613 B1 | | 8/2001 | Hsu | |
| 6,804,768 B2 | * | 10/2004 | Moyer ........................ | 711/216 |
| 6,915,373 B2 | | 7/2005 | Bennett | |
| 7,051,184 B2 | * | 5/2006 | Lane .......................... | 711/220 |

OTHER PUBLICATIONS

Handy, Jim. The Cache Memory Book. 1998. Academic Press, Inc. 2nd Edition. pp. 16-22.*
Mazen Kharbutli, Keith Irwin, Yan Solihin and Jaejin Lee, *Using Prime Numbers for Cache Indexing to Eliminate Conflict Misses*, 10th International Symposium on High Performance Computer Architecture (HPCA '04), Feb. 2004, hpca, p. 288.

* cited by examiner

*Primary Examiner*—Matt Kim
*Assistant Examiner*—Kaushikkumar Patel
(74) *Attorney, Agent, or Firm*—Meyertons, Hood, Kivlin, Kowert & Goetzel, P.C.

(57) ABSTRACT

In one embodiment, a cache memory system includes a cache memory coupled to a cache controller. The cache memory controller may receive an address and generate an index value corresponding to the address for accessing a particular entry within the cache memory. More particularly, the cache controller may generate the index value by performing a hash function on a first portion of the address such as an address tag, and combining a result of the hash function with a second portion of the address such as an index, for example.

11 Claims, 3 Drawing Sheets

CACHE MEMORY SYSTEM INCLUDING A PARTIALLY HASHED INDEX

BACKGROUND OF THE INVENTION

1. Field of the Invention

This invention relates to computer systems that employ cache memory systems and, more particularly, to indexing techniques within cache memory systems.

2. Description of the Related Art

A cache memory is a high-speed memory unit interposed in the memory hierarchy of a computer system between a slower system memory and a processor. A cache typically stores recently used data to improve effective memory transfer rates to thereby improve system performance. The cache is usually implemented by semiconductor memory devices having speeds that may be more comparable to the speed of the processor, while the system memory utilizes a less costly, lower speed technology.

A cache memory typically includes a plurality of memory locations that each stores a block or a "line" of two or more words. Each line in the cache has associated with it an address tag that is used to uniquely identify the address of the line. The address tags are typically included within a tag array memory device. Additional bits may further be stored for each line along with the address tag to identify the coherency state of the line.

A processor may read from or write directly into one or more lines in the cache if the lines are present in the cache and if the coherency state allows the access. For example, when a read request originates in the processor for a new word, whether data or instruction, an address tag comparison is made to determine whether a valid copy of the requested word resides in a line of the cache memory. If the line is present, a cache "hit" has occurred and the data is used directly from the cache. If the line is not present, a cache "miss" has occurred and a line containing the requested word is retrieved from the system memory and may be stored in the cache memory. The requested line is simultaneously supplied to the processor to satisfy the request.

Similarly, when the processor generates a write request, an address tag comparison is made to determine whether the line into which data is to be written resides in the cache. If the line is present, the data may be written directly into the cache (assuming the coherency state for the line allows for such modification). If the line does not exist in the cache, a line corresponding to the address being written may be allocated within the cache, and the data may be written into the allocated line.

In many cache systems, in addition to the address tag, an index may be used to determine which location (if direct-mapped) or which set (if set associative) in the cache holds a given cache line of data. In some conventional systems, the index may be some number of bits of the cache line address not included within the tag. However, one drawback to the use of this conventional index is that depending on the type of accesses (e.g., strided accesses), a high level of cache line thrashing may occur.

In other conventional systems another cache indexing function may include hashing the entire cache line address. In such systems, this indexing function may prevent some pathological cases in which strided cache accesses or non-randomly mapped pages have a very high conflict rate. However, this conventional index function may also have drawbacks. For example, this index function may not work well for accesses with strong spatial locality, such as blocks of successive addresses.

SUMMARY

Various embodiments of a cache system including a partially hashed index are disclosed. In one embodiment, a cache memory system includes a cache memory coupled to a cache controller. The cache memory controller may be configured to receive an address and to generate an index value corresponding to the address for accessing a particular entry within the cache memory. More particularly, the cache controller may be configured to perform a hash function on a first portion of the address such as an address tag, and by combining a result of the hash function with a second portion of the address such as an index, for example to generate the index value. In some implementations, combining the hash result with the index may include performing an Exclusive-Or operation between the hash result and selected index bits.

Figure 1:
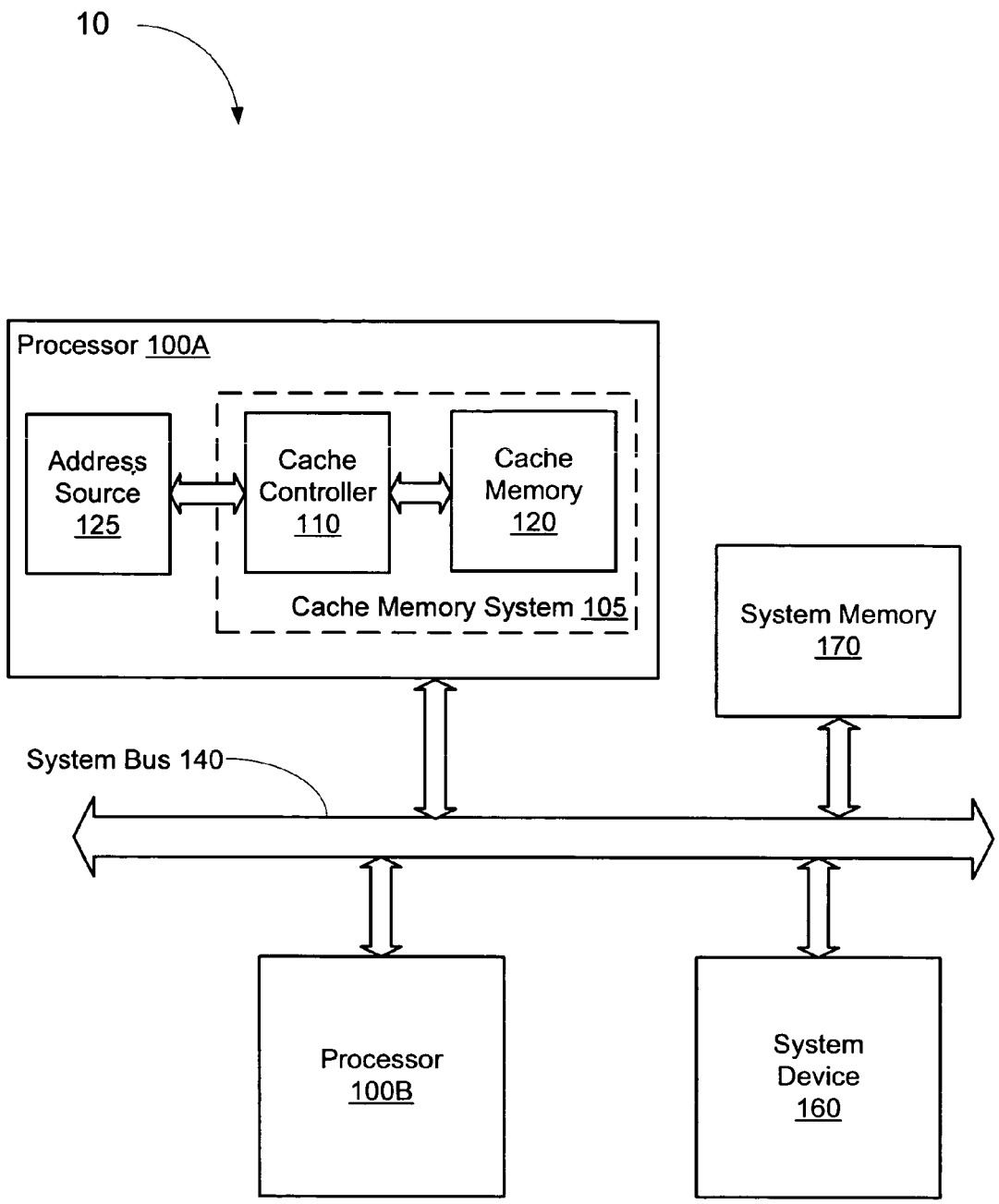
FIG. 1 is a block diagram of a computer system including a processor employing a cache memory system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system is shown. Computer system 10 includes a processor 100A, a processor 100B, a system device 160 and a system memory 170 interconnected through a system bus 140. Processor 100A illustratively includes an address source 125, and a cache controller 110 that is coupled to a cache memory 120. Cache controller 110 and cache memory 120 are collectively referred to as a cache memory system 105. For simplicity, elements shown within the processor 100A are not shown within processor 100B. However, it is noted that processor 100B may be configured identically to processor 100A, as illustrated. It is also noted that components having the same reference number followed by a letter may be referred to generally by the reference number only, when appropriate. For example, when referring generally to processors 100A and 100B reference may be made to processors 100.

In the illustrated embodiment, processor 100A and cache memory system 105 are integrated upon a common integrated circuit (IC) chip. In one embodiment cache memory 120 may be a level 2 (L2) cache, although in other embodiments, cache memory 120 may be any level cache and may be implemented on a separate IC chip. Depending upon the implementation and whether cache memory is an instruction cache or a data cache, address source 125 may be either a load/store unit or a fetch unit, respectively. In one embodiment, processors 100 may be illustrative of a processor in the SPARC™ family of processors although other processor architectures are possible and contemplated.

In one embodiment, cache memory 120 may include a number of memory devices (not shown). The memory devices may be implemented using some type of fast memory devices such as static random access memory (SRAM) devices or dynamic RAM (DRAM) devices implemented as pseudo-SRAM devices, for example. During operation, cache memory 120 stores a plurality of cache lines. In one embodiment, each cache line may be stored in a row formed by corresponding entries of the memory devices. For example, a given cache line may be stored across a set of locations of the memory devices that may be accessed using a common index address. In addition, a tag corresponding to the address may be stored along with the cache line.

In the illustrated embodiment, system device 160 is representative of any type of system device capable of performing coherent memory transactions. For example, system device 160 may be an I/O bridge device that may perform a read/modify/write operation to a piece of data within a block of memory of system memory 170. To perform such an operation, system device 160 may need to gain ownership of the memory block and depending on the coherency protocol, the corresponding cache line within cache memory 120.

In one embodiment, system memory 170 may include one or more memory devices. In addition, system memory 170 may include a memory controller (not shown) to control accesses to the memory devices. The memory devices may be implemented using any type of device in the dynamic random access memory (DRAM) family of devices such as synchronous DRAM (SDRAM) or double data rate SDRAM (DDRSDRAM), for example. It is noted that in one embodiment, the memory devices may be mounted to one or more memory modules (not shown).

Processor 100A may perform transaction requests to cache memory 120. As will be described in greater detail below in conjunction with the description of FIG. 2 and FIG. 3, to reduce the number of conflict misses when accessing cache memory 120, in various embodiments, cache controller 110 may generate an index value by combining a hash of a first portion of the address with a second portion of the address to access cache memory 120.

Figure 2:
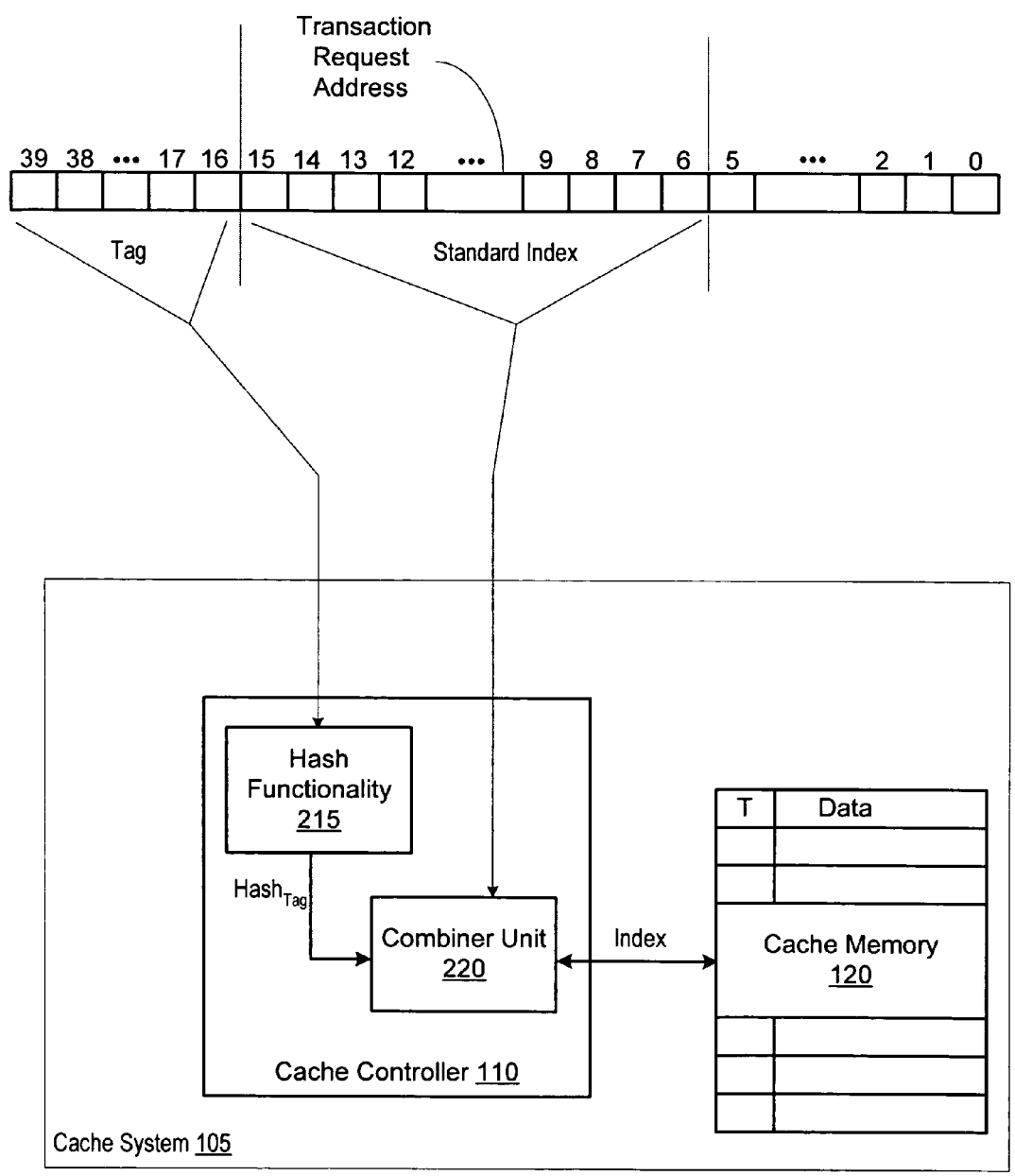
FIG. 2 is a block diagram of one embodiment of the cache memory system of FIG. 1.

Referring to FIG. 2, a block diagram of one embodiment of cache memory system 105 is shown. Components that correspond to those shown in FIG. 1 are numbered identically for clarity and simplicity. Cache memory system 105 includes a cache controller 110 coupled to a cache memory 120. As described above, cache memory 120 is configured to store a plurality of cache lines each having a corresponding address. In addition, a tag (T) corresponding to the address may be stored along with the cache line data. Cache controller 110 includes hash functionality 215 coupled to a combiner unit 220.

In one embodiment, a transaction request received by cache controller 110 includes an associated transaction request address. In the illustrated embodiment, the received address is a 40-bit address and a cache line may be 64 bytes. When the address is used on a cache line basis, the least significant bits 5:0 may be used. Address bits 6:15 represent standard index bits which might otherwise be used, in a conventional cache system, to select a particular cache entry. Address bits 16:39 represent the tag. It is noted that the selection of which bits represent tag bits and which bits represent index bits may be dependent on specific cache memory implementation details such as the size of cache memory 120, etc. Thus, it is contemplated that in other embodiments, different numbers of address bits may be used and different bits may be used to represent the tag and index bits.

In one embodiment, cache controller 110 is configured to receive the cache transaction request address from core logic within processor 100 (e.g., address source 125). More particularly, the tag bits (e.g., bits 39:16) are routed to and received by hash functionality 215, while the standard index bits (e.g., bits 16:6) are routed to and received by combiner unit 220.

Hash functionality 215 may be implemented in variety of ways, as desired. In the illustrated embodiment, hash functionality 215 is configured to apply a hash function to the received tag bits. The result is a hash of the tag, depicted as $Hash_{tag}$. In one embodiment, the hash function applied by hash functionality 215 may include performing an operation such as an Exclusive-Or (XOR) on groups of selected bits of the tag to generate a $Hash_{tag}$. For example, in the illustrated embodiment, there are 24 tag bits. In one particular implementation, every 5th tag bit is bit-wise XOR'd together to produce one $Hash_{tag}$ bit, resulting in five $Hash_{tag}$ bits. In one embodiment, to reduce the fan-in on the logic gates, the XOR operation may be implemented using any number of levels of XOR multi-input gates. For example, three levels of three-input XOR gates may be used, forming an XOR tree. However, it is contemplated that other bit groupings may be used. It is also contemplated that in other embodiments, other hash functions such as a modulo a prime hash function, for example, may be used.

Combiner unit 220 may also be implemented in a variety ways, as desired and is configured to combine the standard index bits with $Hash_{tag}$ to generate an index value that is used to access cache memory 120. In one embodiment, combiner unit 220 may combine the bits of $Hash_{tag}$ with a corresponding number of the standard index bits using a bit-wise XOR function. For example, if five $Hash_{tag}$ bits are produced by hash functionality 215, the five most significant bits (e.g., bits 15:11) of the standard index may be XOR'd with the five $Hash_{tag}$ bits. The remaining five bits of the standard index may bypass the XOR logic and be concatenated with the result of the XOR to form the index value that is used to access a particular location within cache memory 120.

It is noted that in other embodiments, the XOR logic (not shown) in the hash functionality 215 and the XOR logic (not shown) in combiner unit 220 may be combined in an effort to flatten the levels of logic and thereby possibly reduce the delay in generating an index value and thus reduce the access delay to cache memory 120. As such, instead of having two functions to generate the index value, there may be a single logically equivalent function block. For example, the most significant standard index bits may be XOR'd directly with the selected tag bits and concatenated with the remaining standard index bits to produce the index value.

In an alternative embodiment, cache memory 120 may be divided into independently selectable banks or sections. Each bank may be selected using the remaining bits of the standard index that bypass the XOR logic. Since these bits do not incur the delay associated with the XOR logic, they may be available prior to the index value being generated by combiner unit 220. Accordingly, once the index value has been generated, it may be used to select the particular entry in the pre-selected bank of cache memory 120.

Figure 3:
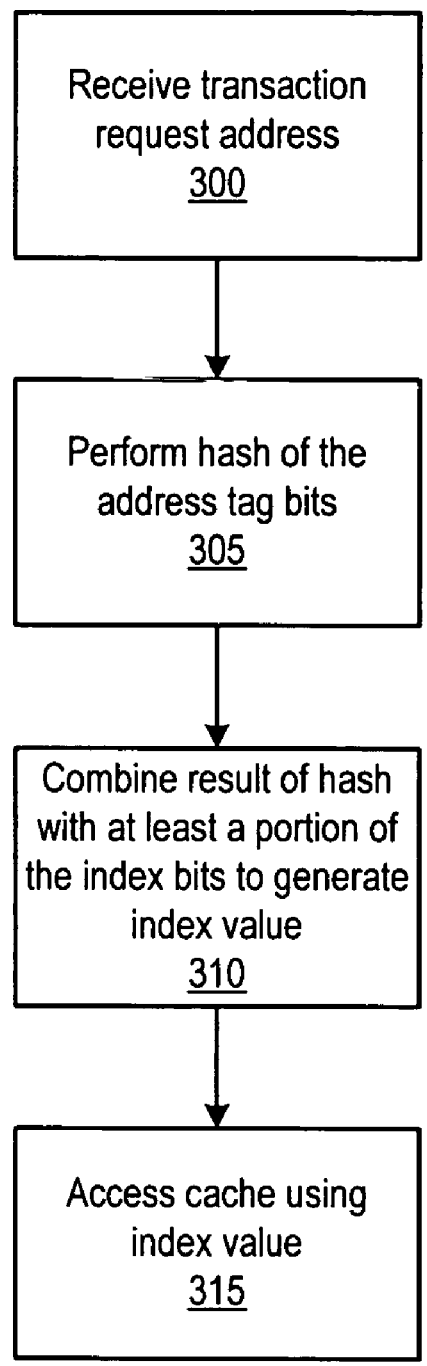
FIG. 3 is a flow diagram describing the operation of one embodiment of the cache memory system of FIG. 1 and FIG. 2.

Referring to FIG. 3, a flow diagram illustrating the operation of one embodiment of cache system 105 is shown. Referring collectively to FIG. 2 and FIG. 3, a cache access transaction request including an address is received by cache controller 110 (block 300). The tag portion of the address is routed to hash functionality 215, where hash functionality 215 operates on the tag bits. As described above, in one embodiment, bit-wise XOR operations may be performed on groups of the tag bits to create a hash result (305). The hash result is provided to combiner unit 220, which also receives the index bits of the received address. It is noted that in various embodiments, hash functionality 215 may operate on all or only a portion of the tag bits.

Combiner unit 220 combines the hash result with at least some of the index bits to form an index value. As described above, in one embodiment, combiner unit 220 may perform bit-wise XOR operations on the bits of the hash result and a corresponding number of high-order index bits. For example, if there are five hash result bits, they may be XOR'd with the five most significant bits of the index to form five high-order bits of the index value. Combiner unit 220 may then concatenate the remaining lower order index bits with the high-order index value bits to form the complete index value (310). Combiner unit 220 provides the resulting index value which may the be used to access a particular location within cache memory 120.

Index values generated as described above in various embodiments may provide a good randomization of some accesses such as strided accesses and accesses to non-randomly allocated pages, for example. In addition, good spatial locality may be maintained such that accesses to the same aligned block of N consecutive cache lines should not conflict, where N is the number of sets in the cache.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cache memory system comprising:
a cache memory; and
a cache controller coupled to the cache memory, wherein the cache memory controller is configured to receive an address and to generate an index value corresponding to the address for accessing a particular entry within the cache memory;
wherein the cache controller is configured to generate the index value by performing a hash function on a first portion of the address and by combining a result of the hash function with a second portion of the address;
wherein performing the hash function includes performing a first bit-wise Exclusive-Or (XOR) operation on groups of selected bits of the first portion of the address; and
wherein the combining includes:
performing a second bit-wise Exclusive-Or operation between a first subset of bits of the second portion of the address and the result of the hash function; and
concatenating a second subset of the second portion with the result of the first bit-wise Exclusive-Or operation.

2. The cache system as recited in claim 1, wherein the second portion of the address corresponds to an index including a number of address bits used to access a given size of the cache memory and the first portion of the address corresponds to an address tag including a number of most significant address bits not included in the index.

3. The cache system as recited in claim 2, wherein the first portion of the address corresponds to all bits of the address tag.

4. The cache system as recited in claim 2, wherein the cache controller is further configured to combine the result of the hash function with the first subset of the second portion of the address by performing a bit-wise Exclusive-Or operation between a selected subset of most significant bits of the index bits and the result of the hash function.

5. The cache system as recited in claim 4, wherein the cache controller is further configured to access a particular section of the cache memory based upon any remaining least significant bits of the index that are not combined with the result of the hash function.

6. A method of accessing a cache memory, the method comprising:
receiving an address; and
generating an index value corresponding to the address for accessing a particular entry within the cache memory;
wherein generating an index value includes:
performing a hash function on a first portion of the address by performing a first bit-wise Exclusive-Or operation on groups of selected bits of the first portion of the address; and
combining a result of the hash function with a second portion of the address including:
performing a second bit-wise Exclusive-Or operation between a first subset of bits of the second portion of the address and the result of the hash function; and
concatenating a second subset of the second portion with the result of the first bit-wise Exclusive-Or operation.

7. The method as recited in claim 6, wherein the second portion of the address corresponds to an index including a number of address bits used to access a given size of the cache memory and the first portion of the address corresponds to an address tag including a number of most significant address bits not included in the index.

8. The method as recited in claim 7, wherein the first portion of the address corresponds to all bits of the address tag.

9. The method as recited in claim 7, wherein combining the result of the hash function with the first subset of the second portion of the address includes performing a bit-wise Exclusive-Or operation between a selected subset of the most significant bits of the index bits and the result of the hash function.

10. The method as recited in claim 9, further comprising accessing a particular section of the cache memory based upon any remaining least significant bits of the index that are not combined with the result of the hash function.

11. A computer system comprising:
a system memory;
a processor coupled to the system memory via a bus;
wherein the processor includes a cache memory system including:
a cache memory; and
a cache controller coupled to the cache memory, wherein the cache memory controller is configured to receive an address and to generate an index value corresponding to the address for accessing a particular entry within the cache memory;

wherein the cache controller is configured to generate the index value by performing a hash function on a first portion of the address and by combining a result of the hash function with a second portion of the address;

wherein performing the hash function includes performing a bit-wise Exclusive-Or (XOR) operation on groups of selected bits of the first portion of the address; and wherein the combining includes:
performing a second bit-wise Exclusive-Or operation between a first subset of bits of the second portion of the address and the result of the hash function; and concatenating a second subset of the second portion with the result of the first bit-wise Exclusive-Or operation.

* * * * *

UNITED STATES PATENT AND TRADEMARK OFFICE
CERTIFICATE OF CORRECTION

| | | |
|---|---|---|
| PATENT NO. | : 7,606,994 B1 | Page 1 of 1 |
| APPLICATION NO. | : 10/985525 | |
| DATED | : October 20, 2009 | |
| INVENTOR(S) | : Robert E. Cypher | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Twelfth Day of October, 2010

David J. Kappos
*Director of the United States Patent and Trademark Office*